Patented Nov. 18, 1930

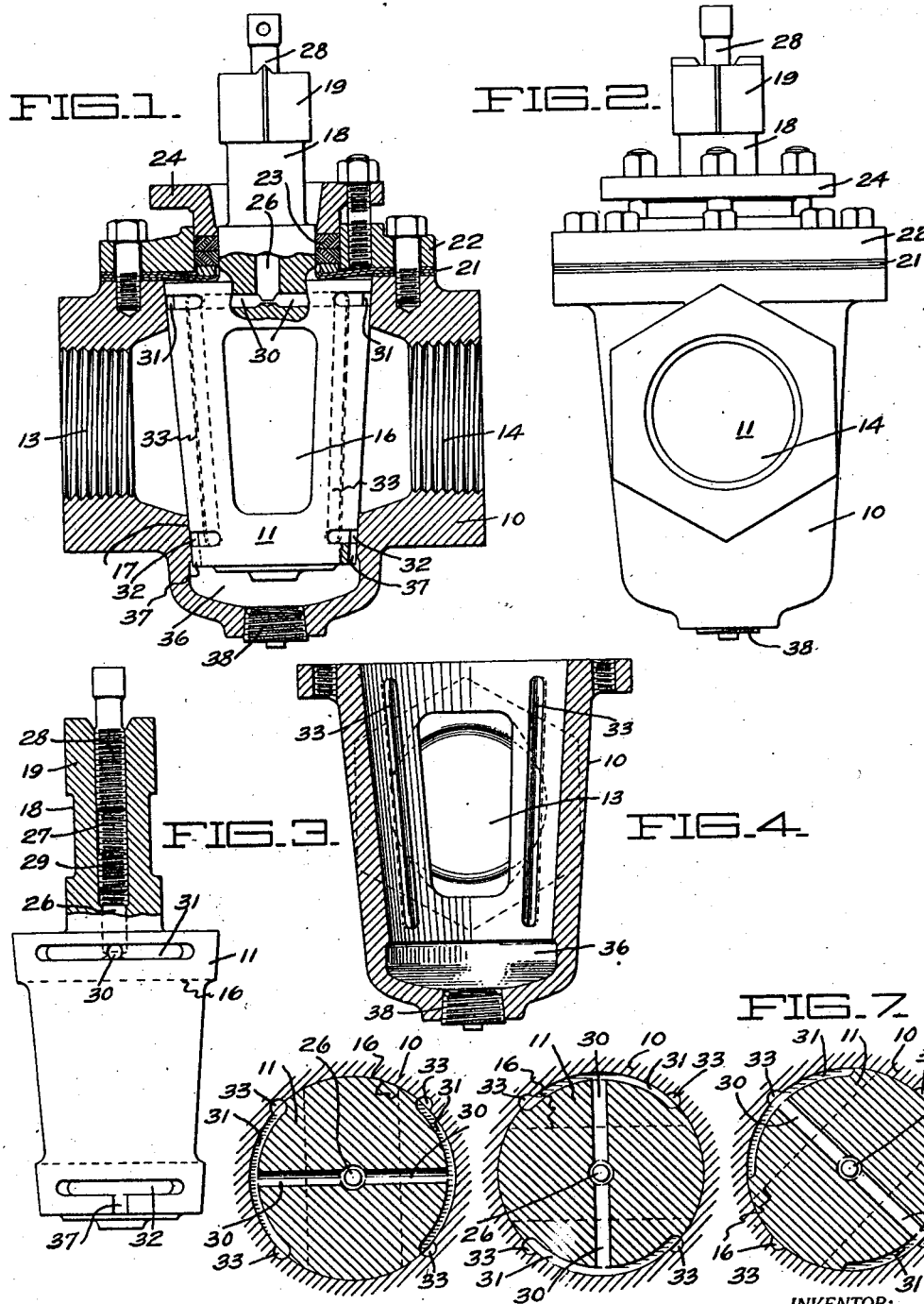

1,781,821

UNITED STATES PATENT OFFICE

SVEN JOHAN NORDSTROM, OF SAN FRANCISCO, CALIFORNIA, ASSIGNOR TO MERCO NORDSTROM VALVE COMPANY, OF SAN FRANCISCO, CALIFORNIA, A CORPORATION OF DELAWARE

LUBRICATED PLUG VALVE

Application filed February 26, 1929. Serial No. 342,853.

This invention relates generally to valves of the type in which a plug member is rotatably disposed within a cooperating body member. It relates particularly to valves of this character in which provision is made for lubricating the seating surface between the valve members.

It is a general object of this invention to devise a novel plug valve in which provision is made for effecting adequate lubrication of the seating surface, in combination with means for effecting longitudinal jacking or unseating movement of the plug member.

It is a further object of this invention to devise a lubricated plug valve in which a single source or chamber for lubricant under pressure is utilized for supplying lubricant under pressure to a groove in the seating surface of the valve which substantially surrounds either one or both the outflow and inflow passages, and which also serves to supply lubricant to fluid jacking means.

It is a further object of this invention to devise a lubricated plug valve utilizing a lubricated receiving chamber associated with the plug member in such a manner that when fluid is introduced into the chamber under pressure, it effects longitudinal jacking movement of the plug, and which also utilizes certain groove portions interrupting the seating surface and which serve to conduct lubricant to said chamber, said groove portions being arranged in such a manner that one or more groove portions exposed for certain valve positions will not be in communication with said chamber.

It is a further object of this invention to devise a plug valve incorporating lubricating means including a groove for lubricant which interrupts the seating surface and substantially surrounds one of the inflow or outflow passages when the valve is closed, and which also has in combination lubricant jacking means which can be operated in open, closed and intermediate positions of the rotary valve member.

Further objects of the invention will appear from the following description in which I have set forth the preferred embodiment of my invention. It is to be understood that the appended claims are to be accorded a range of equivalents consistent with the state of the prior art.

Referring to the drawing:

Figure 1 is a side elevational view of a valve constructed in accordance with my invention.

Fig. 2 is an end view of the valve as shown in Fig. 1.

Fig. 3 is a detail showing the plug member of the valve shown in Figs. 1 and 2, the stem of the plug being shown in cross section.

Fig. 4 is a cross sectional detail illustrating the body member of the valve of Figs. 1 and 2.

Figs. 5, 6 and 7 are diagrammatic cross sectional details illustrating different operating positions of the plug member.

A detailed description of my invention is as follows: As shown in Fig. 1, there is shown a valve body 10 within which is disposed a rotatable tapered plug member 11. The body is provided with inflow and outflow passages 13 and 14, and plug member 11 is provided with a cooperating port 16 arranged to register with passages 13 and 14 when the valve is in open position. The plug and body members are interfitted in such a manner as to form what is termed a "seating surface" 17 between the same.

Extending from one end of plug member 11 there is a suitable stem 18, having a square portion 19 or being otherwise formed for receiving a wrench, handle, or other appliance for rotating the plug member. To provide suitable packing between the stem 18 and the body 10, I have shown a relatively thin metal gasket or ring-like diaphragm 21, having its outer periphery clamped to the body by means of ring 22. Positioned between the inner periphery of ring 22 and stem 18, are a plurality of compressible packing rings 23, which are pressed downwardly towards the plug member 11 by means of a suitable gland 24. Packing rings 23 serve to press down the inner peripheral portion of gasket 21 upon the upper face of plug member 11, thus affording an effective seal and at the same time permitting limited longitudinal movement of plug member 11 to unseat the same.

To supply lubricant to various parts of my plug valve I have shown a lubricant chamber 26, which is shown as the lower portion of a bore drilled down thru the stem 18. The upper portion of this bore forms an auxiliary lubricant chamber 27 and is threaded to receive a screw 28. Between chambers 26 and 27, there is a suitable check valve 29, which permits lubricant being forced from chamber 27 to chamber 26, but prevents back flow. Chamber 27 together with screw 28 forms convenient means for forcing lubricant under pressure into chamber 26.

In the formation of the plug and body members, provision is made to provide a groove interrupting the seating surface 17 of such a character as to substantially surround one or both the outflow and inflow passages when the valve is in closed position, and this groove is supplied with lubricant from the chamber 26. For purposes which will be presently clear, these grooves are formed by a plurality of groove portions, some of which are formed in the body member and others in the plug member. As shown in Fig. 3, the plug member 11 is provided with upper and lower groove portions 31 and 32, formed in its periphery. Preferably a groove portion 31 is provided upon each side of the plug member as is clear from Fig. 1, and likewise two lower groove portions 32 are provided. Groove portions 31 are in communication with chamber 26 thru passages 30. In the body member I preferably provide longitudinal groove portions 33, four of these groove portions being formed in the preferred embodiment shown. Preferably the disposition of longitudinal grooves 33 is such that a longitudinal groove is provided upon each side of outflow passage 14, where this passage interrupts the seating surface, as shown in Fig. 5. The other two longitudinal grooves are preferably likewise disposed upon either side of the inflow passage. When the plug member is within the valve body grooves 31 and 32 are disposed and extend laterally above and below the valve body passages. The manner in which these grooves cooperate will be presently explained.

As fluid means for effecting longitudinal jacking or unseating movement of the plug member, I have shown a well or chamber 36 preferably formed in the valve body at the lower end of the plug member. One enclosing wall for the chamber 36 is formed by a surface of the plug member, preferably the bottom face thereof, so that when fluid pressure exists within chamber 36, a force component is created tending to lift the plug member. Communication is established between chamber 36 and lubricant chamber 26, but rather than to form such communication directly, I preferably effect certain novel results by establishing communication thru certain of the groove portions described above.

As a simple and preferred embodiment I have shown grooves 37 formed in plug member 11, and these grooves 37 serve to establish communication between groove portions 32 and well or chamber 36. To permit occasional draining or cleaning of chamber 36, I have provided a suitable removable plug 38.

When my valve is in operation, and is in closed position, it is possible to both lubricate the seating surface and to effect longitudinal jacking movement of the plug member in case this member has become fast or tight within the body. Thus an operator turning down upon screw 28, can force a plastic lubricant under pressure into chamber 26, from which it is delivered to groove portion 31 thru passages 30. Each groove portion 31 at this time communicates with the upper end of two longitudinal grooves 33, as shown in Fig. 5. Each of the lower groove portions 32 likewise communicates with the lower ends of two longitudinal grooves 33. Lubricant supplied from grooves 31 is therefore supplied to longitudinal grooves 33, and from these grooves it is supplied to the lower lateral grooves 32. From lower groove portions 32 it is supplied to the chamber 36 thru the grooves 37. As is clear from Fig. 5, the groove portions for closed position of the valve form what may be termed a single groove substantially surrounding the outflow passage 14 and interrupting the seating surface, and another groove which substantially surrounds the inflow passage 13. Lubricant extruded from the groove portions therefore adequately smears lubricant about the outflow and inflow passages, thus insuring against leakage. If sufficient pressure is supplied to the lubricant chamber 26, as by turning down screw 28 with sufficient force, the fluid pressure developed in chamber 36, by virtue of the lubricant introduced into the same thru grooves 37, will lift or jack the plug member away from its seat a limited amount. Limited longitudinal movement of the plug member is permitted by virtue of the resilient nature of gasket 21 and the packing about the plug stem 18. Longitudinal jacking movement of the plug member not only breaks the plug member away from the body member in case the plug has become set or fast, but also permits better extrusion of grease from the various groove portions, thus more effectively smearing the lubricant upon the seating surface.

When the valve is in open position lateral groove portions 31 and 32 again communicate with longitudinal groove portions 33, so that in this position lubricant can likewise be introduced into chamber 36 to effect jacking movement of the plug member. Lubrication of the seating surface in this position can also be effected, but in this position it is unnecessary to have groove portions which form substantially complete grooves surrounding the outflow and inflow passages.

When the valve is in an intermediate position, or partly closed, it is evident that port 16 will expose portions of two of the longitudinal grooves 33. However at this time the exposed groove portions 33 are out of communication with the lateral groove portions 31 and 32 as shown in Fig. 7, so that no lubricant can be supplied to the exposed groove portions. This feature of my invention obviates extrusion of surplus lubricant due to fluid pressure existing in chamber 36. In other words lubricant from neither chamber 26 nor chamber 36 can be discharged thru an exposed groove portion when the valve is in an intermediate position. However as shown in Fig. 6, the two longitudinal groove portions 33 which are unexposed are still in communication with lateral groove portions 31 and 32, so that fluid pressure can be applied to chamber 36 from chamber 26, to effect longitudinal jacking movement of the plug member. Thus jacking movement of the plug can be effected when the valve is in either open, closed or an intermediate position, but supplying of lubricant to an exposed groove portion when the valve is in an intermediate position is prevented.

It is to be noted that the sealing function of the lubricant which I supply depends largely upon the fact that this lubricant is smeared over a zone substantially surrounding one of the valve body passages. It is therefore advisable to permit continual progression or circulation thru the various groove portions in one direction, so as to preclude clogging of these portions by hardening or deterioration of the lubricant. The combination of the lubricant receiving chamber 36 with other features of my above described invention, make possible adequate continual progression of lubricant. Thus when the valve is in either open or closed position, lubricant flows in two directions toward the ends of groove portions 31, downwardly thru longitudinal groove portions 33, toward the centers of groove portions 32 from the ends thereof, and downwardly thru grooves 37, to be received by chamber 36. From chamber 36 lubricant gradually extrudes to the valve passages. From the arrangement of the groove portions when the valve is in closed position, it is apparent that I provide a groove interrupting the valve seating surface which substantially surrounds at least one of the valve passages, and which has one portion thereof in communication with chamber 26, and another portion thereof in communication with chamber 36.

If desired movement of the plug member can be limited to 90 degrees by a suitable stop. I prefer however to omit a stop of this character so that the plug member can be turned thru 360 degrees, as such movement aids in securing distribution of lubricant to the various longitudinal groove portions.

I claim:

1. In a valve, a body member having an inflow and an outflow passage, a tapered plug member rotatable within said body and having a port adapted to register with said passages when the plug is in open position, said members having a seating surface formed between the same, a groove interrupting said seating surface and substantially surrounding at least one of said passages when the plug member is in closed position, means utilizing fluid pressure for effecting longitudinal jacking movement of said plug to unseat the same, and a lubricant chamber communicating with both said groove and said means and adapted to contain lubricant under pressure.

2. In a valve, a body member having an inflow and an outflow passage, a tapered plug member rotatable within said body and having a port adapted to register with said passages when the plug is in open position, said members having a seating surface formed between the same, a groove interrupting said seating surface and substantially surrounding at least one of said passages when the plug member is in closed position, means utilizing fluid pressure for effecting longitudinal jacking movement of said plug to unseat the same, and a lubricant chamber communicating with one portion of said groove, another portion of said groove being in communication with said jacking means, said chamber being adapted to contain lubricant under pressure.

3. In a valve, a body member having an inflow and an outflow passage, a tapered plug member rotatable within said body and having a port adapted to register with said passages when the plug is in open position, said members having a seating surface formed between the same, a groove interrupting said seating surface and substantially surrounding at least one of said passages when the plug member is in closed position, a chamber for containing fluid lubricant under pressure communicating with one portion of said groove, and a lubricant receiving chamber communicating with another portion of said groove.

4. In a valve, a body member having an inflow and an outflow passage, a tapered plug member rotatable within said body and having a port adapted to register with said passages when the plug is in open position, said members having a seating surface formed between the same, a groove interrupting said seating surfaces and substantially surrounding one of said passages when the plug member is in closed position, a chamber for fluid lubricant under fluid pressure communicating with an upper portion of said groove, and a lubricant receiving chamber communicating with a lower portion of said groove.

5. In a valve, a body member having inflow and outflow passages, a tapered plug member rotatable within said body and having a port registering with said passages for open position of the plug member and being out of registry with said passages when in closed position, said members having a seating surface formed between the same, a groove interrupting said surface and arranged to substantially surround one of said passages when the valve is in closed position, said groove being formed of lateral upper and lower portions and longitudinal portions upon opposite sides of said one passage, a chamber for containing lubricant under pressure communicating with said grooves when the valve is in closed position, means for automatically disrupting communication between said chamber and an exposed longitudinal groove when the valve is in an intermediate position, a lubricant receiving chamber, said chamber being in continuous communication with said first chamber thru a longitudinal groove portion for open, closed and intermediate positions of the plug member.

6. In a valve, a body member having inflow and outflow passages, a tapered plug member rotatable within said body and having a port registering with said passages in an open position of the plug and being out of registry when in closed position, said members having a seating surface formed between the same, a groove interrupting said surface and arranged to substantially surround one of said passages when the plug is in closed position, said groove being formed of lateral portions above and below the inflow passage and longitudinal portions on either side of said one passage, a chamber for containing lubricant under pressure communicating with said groove when the valve is closed, means for automatically disrupting communication between said chamber and an exposed longitudinal groove portion when the valve is in an intermediate position, means utilizing fluid under pressure for effecting longitudinal movement of said plug member, said last means being in continuous communication with said chamber for open, closed, and intermediate positions of the valve.

7. In a valve, a body member having inflow and outflow passages, a tapered plug member rotatable within said body and having a port registering with said passages in an open position of the plug and being out of registry when in closed position, said members having a seating surface formed between the same, a groove interrupting said surface and arranged to substantially surround one of said passages when the plug is in closed position, said groove being formed of lateral portions above and below said one passage and longitudinal portions on either side of said one passage, a chamber for containing lubricant under pressure communicating with said groove when the valve is closed, means for automatically disrupting communication between said chamber and an exposed longitudinal groove when the valve is in an intermediate position, means utilizing fluid under pressure for effecting longitudinal movement of said plug member, said last means consisting of another chamber in continuous communication with said first chamber for open, closed, and intermediate positions of the valve, said chamber being formed between said members at one end of said plug member and being in communication with said lower lateral groove portions.

8. A valve comprising, a casing having a passageway therethrough consisting of an inflow passage and an outflow passage and a bore or seat formed transversely of the passageway, a plug rotatably positioned within the bore and having a hole adapted to register with the passageway when the plug is in open position, there being a longitudinal groove on each side of one of said passages, the plug being provided at one side with a transverse groove above and below the hole therein, the ends of said transverse groove communicating with the ends of the longitudinal groove when the plug is in closed position so as to form a substantially continuous groove around said one passage, said transverse groove being out of communication with an exposed longitudinal groove in an intermediate position of the plug, a reservoir for lubricant under pressure in constant communication with the upper transverse groove, and a chamber located between one end of the plug and the adjacent side of the casing in constant communication with the lower transverse groove.

9. A valve comprising, a casing having a passageway therethrough consisting of an inflow passage and an outflow passage and a bore or seat formed transversely of the passageway, a plug rotatably positioned within the bore and having a hole adapted to register with the passageway when the plug is in open position, there being a longitudinal groove on each side of the inflow passage and a longitudinal groove on each side of the outflow passage, the plug being provided with two circumferentially spaced lateral grooves below the hole in said plug, the ends of said transverse grooves communicating with the ends of the longitudinal grooves when the plug is in closed position so as to form two channels or grooves substantially surrounding said passages, said transverse groove being out of communication with the exposed longitudinal grooves in an intermediate position of the plug, a reservoir for lubricant under pressure in constant communication with the upper transverse grooves, and a chamber located between one end of the plug and the adjacent side of the casing in constant communication with the lower transverse grooves.

10. In a valve, a body member having an inflow and an outflow passage, a tapered plug member rotatable within said body and having a port adapted to register with said passages when the plug is in open position, means for receiving lubricant for sealing substantially entirely around at least one of said passages when the plug member is in closed position and for effecting longitudinal jacking movement of said plug member, and means for supplying lubricant under pressure to said lubricant receiving means.

11. In a valve, a body member having an inflow and an outflow passage, a tapered plug member rotatable within said body and having a port adapted to register with said passages when the plug is in open position, means including depressions formed in the mating surfaces of at least one of said members for receiving lubricant for sealing substantially entirely around at least one of said passages when the plug is in closed position and for effecting longitudinal jacking movement of said plug member, and a single means for supplying lubricant under pressure to the aforementioned means.

12. In a valve, a body member having an inflow and an outflow passage, a tapered plug member rotatable within said body and having a port adapted to register with said passages when the plug is in open position, means for receiving lubricant surrounding at least one of said passages at certain positions of the plug member for sealing said passage, means utilizing fluid pressure for effecting longitudinal jacking movement of said plug, and a single means for supplying lubricant under pressure to both of the aforesaid means.

13. In a valve, a body member having an inflow and an outflow passage, a tapered plug member rotatable within said body and having a port adapted to register with said passages when the plug is in open position, means utilizing fluid pressure for effecting longitudinal jacking movement of said plug, means for receiving lubricant for sealing at least one of said passages at certain jacked positions of the plug member, and a single means for supplying lubricant under pressure to both of the aforesaid means.

14. In a valve, a body member having an inflow and an outflow passage, a tapered plug member rotatable within said body and having a port adapted to register with said passages when the plug is in open position, means utilizing fluid pressure for effecting longitudinal jacking movement of said plug, means for receiving lubricant for sealing at least one of said passages when the plug is in closed position and while either seated or jacked, and a single means for supplying lubricant under pressure to both of the aforesaid means.

In testimony whereof, I have hereunto set my hand.

SVEN JOHAN NORDSTROM.